United States Patent
Bennett et al.

(10) Patent No.: US 10,432,649 B1
(45) Date of Patent: *Oct. 1, 2019

(54) SYSTEM AND METHOD FOR CLASSIFYING AN OBJECT BASED ON AN AGGREGATED BEHAVIOR RESULTS

(71) Applicant: FireEye, Inc., Milpitas, CA (US)

(72) Inventors: James Bennett, Santa Clara, CA (US); Zheng Bu, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/997,443

(22) Filed: Jan. 15, 2016

Related U.S. Application Data

(63) Continuation of application No. 14/221,199, filed on Mar. 20, 2014, now Pat. No. 9,241,010.

(51) Int. Cl.
*H04L 29/06* (2006.01)
*G06F 9/455* (2018.01)
(Continued)

(52) U.S. Cl.
CPC ...... *H04L 63/1425* (2013.01); *G06F 9/45558* (2013.01); *G06F 16/285* (2019.01);
(Continued)

(58) Field of Classification Search
CPC ............... H04L 63/145; H04L 63/1416; G06F 9/45558; G06F 17/2705; G06F 17/30598; G06F 2009/45587
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

(Continued)

*Primary Examiner* — Abu S Sholeman
(74) *Attorney, Agent, or Firm* — Rutan& Tucker, LLP

(57) ABSTRACT

Techniques for detecting malicious behavior of content (object) are described herein. An object is processed within a virtual machine. Responsive to receiving the result of the processing (response object), a parser parses the response object into a plurality of sub-objects. The plurality of sub-objects include a first sub-object and a second sub-object. A first behavior match result is determined based, at least in part, on whether information within the first sub-object corresponds to a identifiers associated with malicious activity. Also, a second behavior match result is determined based, at least in part, on whether information within the second sub-object corresponds to identifiers associated with malicious activity. Thereafter, the first and second behavior match results are aggregated to produce an aggregated result, wherein a malicious behavior score is calculated based, at least in part, on the aggregated result. The object is classified according to the malicious behavior score.

32 Claims, 5 Drawing Sheets

(51) Int. Cl.
*G06F 17/27* (2006.01)
*G06F 16/28* (2019.01)
(52) U.S. Cl.
CPC ........ *G06F 17/2705* (2013.01); *H04L 63/145* (2013.01); *H04L 63/1416* (2013.01); *G06F 2009/45587* (2013.01)

(56) References Cited

U.S. PATENT DOCUMENTS

| | | |
|---|---|---|
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,329,994 B1 * | 12/2001 | Gever ................ G06T 13/20 345/473 |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,490 B1 * | 7/2012 | Vos ................ H04L 63/0227 709/206 |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |

(56) References Cited

U.S. PATENT DOCUMENTS

| | | |
|---|---|---|
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,638,793 B1 * | 1/2014 | Ben-Mayor ............ H04L 45/38 370/389 |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,117,079 B1 * | 8/2015 | Huang ................ G06F 21/566 |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 * | 1/2016 | Bennett ................ H04L 63/145 |
| 9,251,343 B1 | 2/2016 | Vincent |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,246 B1 * | 5/2016 | Wan ..................... G06F 21/566 |
| 9,479,357 B1 * | 10/2016 | Fu ........................ H04W 12/12 |
| 9,495,538 B2 * | 11/2016 | Schneider ............... G06F 21/52 |
| 9,628,500 B1 * | 4/2017 | Kesin .................. H04L 63/1425 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |

(56) References Cited

U.S. PATENT DOCUMENTS

| | | |
|---|---|---|
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhaf et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1* | 2/2009 | Danford ............... H04L 41/0893 455/419 |
| 2009/0037835 A1 | 2/2009 | Goldman |
| 2009/0044024 A1* | 2/2009 | Oberheide ............ G06F 21/562 713/188 |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1* | 5/2009 | Sobko .................... G06F 21/566 726/23 |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0260085 A1* | 10/2009 | Kim ....................... G06F 21/554 726/24 |
| 2009/0265692 A1 | 10/2009 | Godefroid et al. |
| 2009/0271867 A1* | 10/2009 | Zhang .................... G06F 21/56 726/24 |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1* | 2/2010 | Thomas ................. G06F 11/3604 726/22 |
| 2010/0037314 A1* | 2/2010 | Perdisci ................ H04L 63/1416 726/22 |
| 2010/0043073 A1* | 2/2010 | Kuwamura ............ G06F 21/56 726/24 |
| 2010/0054278 A1 | 3/2010 | Stolfo et al. |
| 2010/0058183 A1* | 3/2010 | Hamilton, II ......... G06Q 30/02 715/706 |
| 2010/0058474 A1 | 3/2010 | Hicks |
| 2010/0064044 A1 | 3/2010 | Nonoyama |
| 2010/0077481 A1* | 3/2010 | Polyakov .............. G06F 21/552 726/24 |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281539 A1* | 11/2010 | Burns .................... H04L 63/1441 726/23 |
| 2010/0281541 A1 | 11/2010 | Stolfo et al. |
| 2010/0281542 A1 | 11/2010 | Stolfo et al. |

(56) References Cited

U.S. PATENT DOCUMENTS

| | | |
|---|---|---|
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1* | 2/2011 | Mahaffey ............ G06F 21/564 726/23 |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0191772 A1* | 8/2011 | Larimore ............ G06F 17/30 718/1 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321160 A1* | 12/2011 | Mohandas ............ G06F 21/56 726/22 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0158851 A1* | 6/2012 | Kelmenson ............ G06Q 50/01 709/205 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210388 A1* | 8/2012 | Kolishchak ............ G06F 21/552 726/1 |
| 2012/0210423 A1 | 8/2012 | Friedrichs et al. |
| 2012/0222121 A1 | 8/2012 | Staniford et al. |
| 2012/0240230 A1* | 9/2012 | Lee ............ G06F 21/564 726/24 |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0304244 A1* | 11/2012 | Xie ............ G06F 21/00 726/1 |
| 2012/0311709 A1* | 12/2012 | Kang ............ G06F 21/56 726/24 |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097705 A1* | 4/2013 | Montoro ............ G06F 21/562 726/24 |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0291111 A1* | 10/2013 | Zhou ............ G06F 21/566 726/23 |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0280889 A1* | 9/2014 | Nispel ............ H04L 43/04 709/224 |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0012910 A1* | 1/2015 | Xi ............ G06F 9/45558 717/123 |
| 2015/0013008 A1* | 1/2015 | Lukacs ............ G06F 21/53 726/24 |
| 2015/0096025 A1 | 4/2015 | Ismael |

FOREIGN PATENT DOCUMENTS

| | | |
|---|---|---|
| WO | 02/23805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Cisco "Intrusion Prevention for the Cisco ASA 5500-x Series" Data Sheet (2012).

Clark, John, Sylvian Leblanc,and Scott Knight. "Risks associated with usb hardware trojan devices used by insiders." Systems Conference (SysCon), 2011 IEEE International. IEEE, 2011.

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

(56) References Cited

OTHER PUBLICATIONS

Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek-.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase © CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].
Mori, Detecting Unknown Computer Viruses, 2004, Springer-Verlag Berlin Heidelberg.
Oberheide et al., CloudAV.sub.--N-Version Antivirus in the Network Cloud, 17th USENIX Security Symposium USENIX Security '08 Jul. 28-Aug. 1, 2008 San Jose, CA.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco, Configuring the Catalyst Switched Port Analyzer (SPAN) ("Cisco"), (1992-2003).
Cohen, M.I. , "PyFlag—An advanced network forensic framework", Digital investigation 5120. 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 SIGOPS Operating Systems Review, vol. 42, issue 3, pp. 21-28.
Hjelmvik, Erik , "Passive Network Security Analysis with NetworkMiner", (IN)Secure, Issue 18, (Oct. 2008), pp. 1-100.
IEEE Xplore Digital Library Sear Results for "detection of unknown computer worms". Http://ieeexplore.ieee.org/searchresult.jsp?SortField=Score&SortOrder=desc- &ResultC . . . , (Accessed on Aug. 28, 2009).
Kaeo, Merike , "Designing Network Security", ("Kaeo"), (Nov. 2003).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Liljenstam, Michael , et al., "Simulating Realistic Network Traffic for Worm Warning System Design and Testing", Institute for Security Technology studies, Dartmouth College ("Liljenstam"), (Oct. 27, 2003).

(56) References Cited

OTHER PUBLICATIONS

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford. edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 14/221,199, filed Mar. 20, 2014 Non-Final Office Action dated Apr. 24, 2015.

Venezia, Paul, "NetDetector Captures Intrusions", InfoWorld Issue 27, ("Venezia"), (Jul. 14, 2003).

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC conference, Las Vegas, NV, USA, (Dec. 2002), pp. 1-9.

\* cited by examiner

SYSTEM AND METHOD FOR CLASSIFYING AN OBJECT BASED ON AN AGGREGATED BEHAVIOR RESULTS

CROSS-REFERENCE TO RELATED APPLICATIONS

This application is a continuation of U.S. patent application Ser. No. 14/221,199 filed on Mar. 20, 2014, now U.S. Pat. No. 9,241,010, the entire contents of which are incorporated by reference herein.

FIELD OF THE INVENTION

Embodiments of the present invention relate generally to detecting malicious content. More particularly, embodiments of the invention relate to detecting suspicious behavior of executed objects within network content that may be indicative of malware.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a fingerprint library or database of known malware. The scanning may be initiated manually or based on a schedule specified by a user or system administrator associated with the particular computer. Unfortunately, by the time malware is detected by the scanning software, some damage on the computer, loss of privacy or intellectual property may have already occurred, and the malware may have propagated from the infected computer to other computers. Additionally, it may take days or weeks for new fingerprints to be manually created, the scanning fingerprint library updated and received for use by the scanning software, and the new fingerprints employed in new scans.

Moreover, anti-virus scanning utilities may have limited effectiveness to protect against all exploits by polymorphic malware. Polymorphic malware has the capability to mutate to defeat the fingerprint match process while keeping its original malicious capabilities intact. Fingerprints generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay or otherwise process content within a sandbox established by one or more virtual machines (VMs). Such solutions monitor content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are processed within one or more virtual machines. For example, if a user is trying to download a file over a network, the file is extracted from the network traffic and analyzed in the virtual machine. The results of the analysis aids in determining whether the file is classified as malicious.

New malware ("zero day") and polymorphic malware may not have valid fingerprints available in the matching database for traditional detection using anti-virus scanning or traditional two-phase malware detection. Additionally, traditional malware detection may only trigger malware notification or alerts when certain known malicious fingerprints are present. When attempting to classify content as malicious it can be especially important to minimize false positives, and false negatives, and strike an appropriate balance between the false positives and false negatives. Therefore, traditional malware detection schemes may ignore potentially benign behaviors even though the behaviors also may indicate malware.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
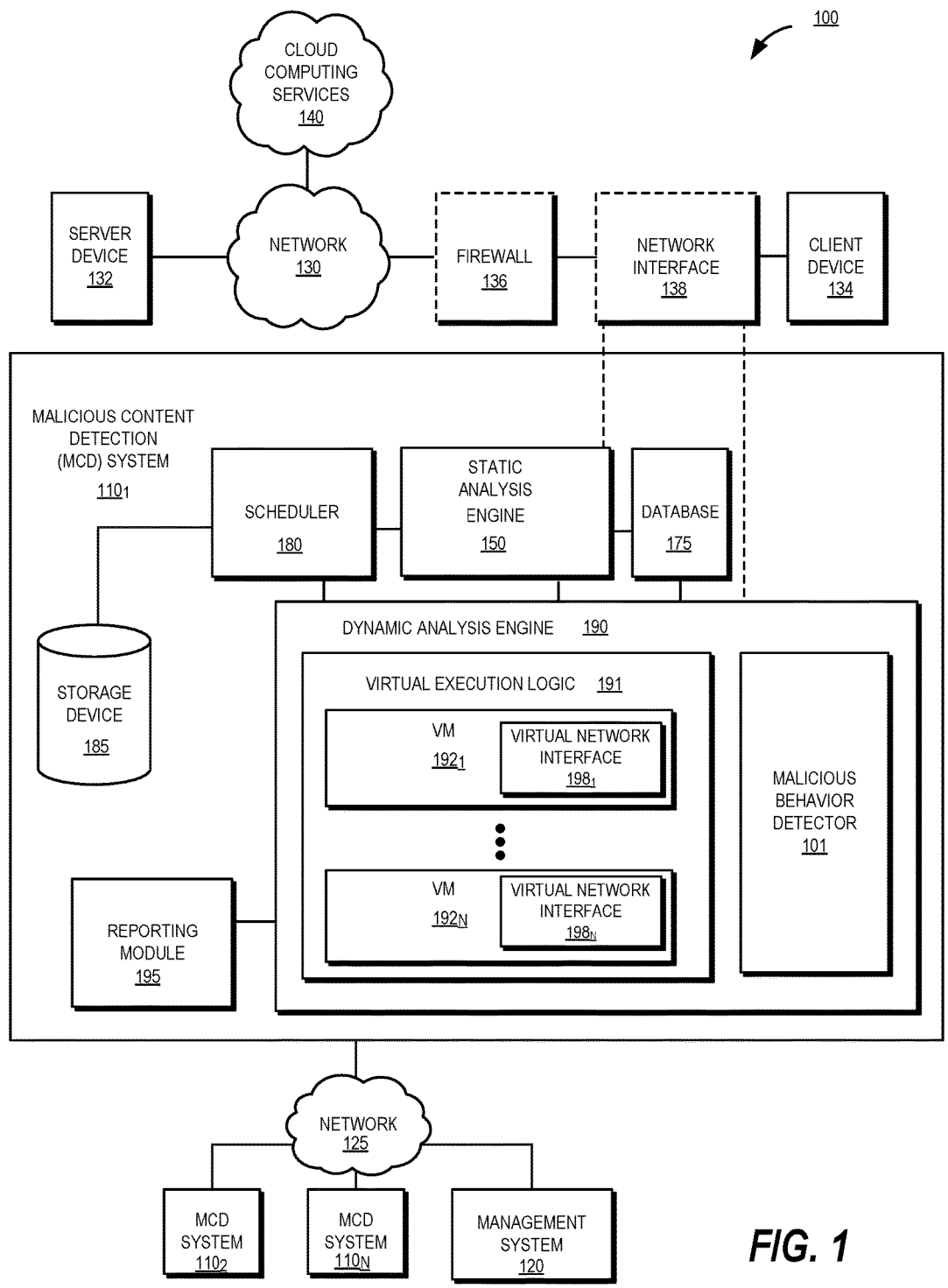
FIG. 1 is block diagram of a communication system deploying a plurality of malware content detection systems having a framework for malicious behavior detection, in one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, a set of generic behaviors detected as a result of processing or triggering a malicious content suspect are analyzed together in aggregate and scored to determine maliciousness likelihood of the malicious content suspect. For example, generic behavior may be general behavior potentially performed by benign as well as malicious content and may not be specific to any known malware or malware family. Although the generic behaviors detected herein may be potentially benign in isolation, the combination of different generic behaviors detected from a single malicious content suspect can provide an overall indication of maliciousness.

In one embodiment, in response to processing or triggering the malicious content suspect (also referred to herein as the input object), a malicious behavior detector (MBD) can analyze the observed result (e.g., execution and/or communication response objects) in a controlled environment. As used herein, response objects can include any object resulting from or created in response to triggering or processing the malicious content suspect. For example, response objects may include files, processes, packets, or request instructions. Response objects may also include all or some portions or characteristics of the malicious content suspect itself.

One or more detector managers (e.g., a communication and/or execution detector manager) can assign behavior detectors (e.g., modules, engines, or plugins) to detect suspicious identifiers within the response objects. In some embodiments, a communication response object is parsed into communication sub-objects. A communication detector manager may assign the communication sub-objects to compatible communication behavior detectors. Each respective behavior detector (e.g., communication or execution detectors) can detect generic behaviors used by MBD to aggregate into an ultimate maliciousness determination for the malicious content suspect. For example, a communication behavior detector may determine whether the communication response object includes any identifiers related to email communication, suspicious Dynamic Domain Name System (DDNS) servers, or communication data related to data theft. In one embodiment, behavior detector output (e.g., match or no match to identifiers) from a plurality of behavior detectors has an assigned weight and all output is aggregated. MBD can provide a malicious behavior score to a classifier according to the aggregated output, the score related to the probability that the malicious content suspect is malware. In one embodiment, the malicious content suspect is reported as malicious when the weighted score reaches a predetermined threshold. Therefore, generic behavior (e.g., email communication) that may not be considered maliciousness in isolation may be analyzed together to form an overall maliciousness determination of the malicious content suspect.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit. In some embodiments, objects may be further separated or divided into "sub-objects" or resulting objects. For example, a parser as described in greater detail below may take as input an object and subdivide or sort one or more sections or parts of the object into multiple sub-objects.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g. Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

An "exploit" may be construed broadly as information (e.g., executable code, data, command(s), etc.) that attempts to take advantage of a vulnerability. Typically, a "vulnerability" is a coding error or artifact of software (e.g., computer program) that allows an attacker to alter legitimate control flow during processing of the software (computer program) by an electronic device, and thus, causes the electronic device to experience undesirable or unexpected behaviors. The undesired or unexpected behaviors may include a communication-based anomaly or an execution-based anomaly, which, for example, could (1) alter the functionality of an electronic device executing application software in a malicious manner; (2) alter the functionality of the electronic device executing that application software without any malicious intent; and/or (3) provide unwanted functionality which may be generally acceptable in another context. To illustrate, a computer program may be considered as a state machine, where all valid states (and transitions between states) are managed and defined by the program, in which case an exploit may be viewed as seeking to alter one or more of the states (or transitions) from those defined by the program.

Malware may be construed broadly as computer code that executes an exploit and/or is intended to cause harm or co-opt operation of an electronic device (e.g., by misappropriating, modifying, or unauthorized attempted exfiltration of data). Conventionally, malware is often said to be designed with malicious intent. An object may constitute or contain malware.

FIG. 1 is an exemplary block diagram of a communication system deploying one or more Malicious Content Detection (MCD) systems having framework for MBD 101.

MCD systems $110_{1-N}$ (N>1, e.g. N=3) may be an electronic device adapted to analyze information associated with network traffic routed over a communication network 130 between at least one server device 132 and at least one client device 134. The communication network 130 may include a public network such as the Internet, in which case an optional firewall 136 (represented by dashed lines) may be interposed prior to accessing client device 134. Alternatively, the communication network 130 may be a private network such as a wireless telecommunication network, wide area network, or local area network, or a combination of networks. While embodiments of the invention are described as being conducted on objects in transit over the communication network 130, other embodiments may include communication sent within a virtual network of a virtual machine (e.g., by virtual network interfaces $198_{1-N}$).

As shown in FIG. 1, MCD system $110_1$ can include static analysis engine 150, database 175, scheduler 180, storage device 185, dynamic analysis engine 190, and reporting module 195. In some embodiments, a virtual (e.g., virtual network interface 1981-N) and physical (not shown) network interface may be contained within the one or more of MCD systems $110_{1-N}$. Static analysis engine 150, scheduler 180 and/or dynamic analysis engine 190 may be software modules executed by a processor (e.g., processor 401) that receives one or more objects and performs analysis on the object, which may involve accessing one or more non-transitory machine-readable storage mediums operating as database 175, storage device 185, and/or reporting module 195. In some embodiments, static analysis engine 150 may be one or more software modules at least partially forming a static framework, where such software modules are executed by a processor. Static analysis engine 150 and dynamic analysis engine 190 may be one or more software modules executed by the same processor or different processors, where these different processors are possibly located at geographically remote locations, located within the same processor package (e.g. different processor cores) and/or communicatively coupled for example via a network.

In general, static analysis engine 150 may be communicatively coupled to receive one or more objects associated with network traffic routed over communication network 130, such as an object that is part of a series of HTTP packets forming the network traffic for example. Static analysis engine 150 may be configured to conduct static scanning operations on the object.

In one embodiment, the object may be presented to dynamic analysis engine 190 for in-depth dynamic analysis using one or more virtual machines (VMs) $192_{1-N}$ (N>1, e.g. N=3) for processing of an executable, file or other object in a run-time environment in which content within the objects is virtually executed.

Scheduler 180 may retrieve, provision, and/or otherwise configure one or more of the VMs $192_{1-N}$ with a runtime environment having a software profile for processing the malicious content suspect. For example, where the malicious content suspect is a downloaded web page, the environment can include a web browser in addition to the operating system. Where the malicious content suspect is an email application, the environment can include an email application in addition to the operating system. Where the malicious content suspect is a PDF, the environment can include an adobe reader or other PDF reader in addition to the operating system. Where the malicious content suspect is a office/productivity document (e.g., a word processing or spreadsheet document), the environment can include office/productivity software (e.g., Microsoft® Word for a word processing document or Microsoft® Excel for a spreadsheet document) in addition to the operating system. Alternatively, the runtime environment can have a software profile that mimics that of a specific client device such as client device 134.

In one embodiment, scheduler 180 may determine the features of client device 134 that are affected by the malicious content suspect (e.g., by receiving and analyzing the network traffic from network interface 138). Such features of client device 134 may include any hardware and/or software functionality that can be virtualized within virtual execution logic 191, such as: (i) virtual ports that are configured to receive the content or may be used by applications running in a virtual environment to process the content for outbound communications, (ii) certain virtual device drivers that are to respond to the content or to applications that process the content, (iii) software applications on client device 132 or software that the object would need to process the content, and/or (iv) any other devices coupled to or software contained within the client device 134 that can respond to the content.

Dynamic analysis engine 190 is adapted to execute virtual execution logic 191 including one or more VMs (e.g., VM $192_{1-N}$) to simulate the receipt and execution, and sometimes transmission of potentially "malicious" content within an object under analysis (e.g., malicious content suspect) within a run-time environment as expected by type of object as noted above. Dynamic analysis engine 190 analyzes the effects of objects upon the run-time environment, such as client device 134. This detection process is referred to as a dynamic malicious content detection. In one embodiment, processing the object may trigger at least two types of behaviors on the run-time environment (e.g., execution or communication). Behaviors may be expected or unexpected for the particular objects processed in that environment. For example, an expected execution behavior may reasonably include a word processing software accessing a spell check database on the storage device of the client. Unexpected behaviors are called anomalies, and either individually or in combination can be indicative of an exploit or malware. For example, an unexpected behavior may include the word processing document attempting to terminate another process within an operating system. In one embodiment, the dynamic analysis engine 190 may further include logic for MBD 101 as shown in greater detail below with regards to FIG. 2.

In some embodiments, a virtual network interface (e.g., virtual network interfaces $198_{1-N}$) is configured to simulate a physical network interface, such as a network interface card, a network gateway device of a local area network (LAN), or a remote node such as a Web server, that the network content would normally access. The virtual network interface may be a virtual network interface of a VM (e.g., VM $192_1$) processing the content suspect or alternatively, the virtual network interface may be represented by different VM (e.g., VM $192_N$) hosted by the same host operating system or VM controller. In one embodiment, because the malicious content suspect is contained or sandboxed within a VM (e.g., VM $192_1$), the suspect cannot actually access an external network (e.g., Internet) without express MCD permission. As a result, the malware does not succeed with exfiltration or collection of malware detection information and cannot interfere with the malware detection process.

In one embodiment, reporting module 195 may issue alerts indicating the presence of malware, and using pointers and other reference information to identify what message(s) (e.g. packet(s)) may contain malware. Additionally, server device 132 may be added to a list of malicious network content providers, and future network transmissions originating from server device 132 may be subjected to deep forensic malware analysis and/or blocked from reaching their intended destinations (e.g., by firewall 136).

In one embodiment, reporting module 195 triggers a malware alert when score generator 270 outputs a detection result or score that exceeds a predetermined threshold. For example, the scoring system may have a predetermined range (e.g., 1 to 10) and threshold (e.g., 7 or greater is malicious) such that each output score may be classified (e.g., by classifier 275) as indicating or not indicating maliciousness of the malicious content suspect. In some embodiments, other score ranges and other thresholds are possible and meeting the threshold may trigger an alert to a designated system, user, or administrator.

In one embodiment, reporting module 195 can generate malware fingerprints for use by a MCD system. The fingerprints may be in addition to or instead of the reporting described above. The MCD system can use the discovered fingerprints for future or subsequent detection and blocking of specific malware fingerprints. In one embodiment, a fingerprint may be based upon data extracted from malicious content as described in greater detail below.

In order to convey maliciousness determination findings, MCD system $110_1$ may provide one or more screen displays for conveying a more detailed summary of malicious files being detected by MCD system $110_1$. In some embodiments, MCD system $110_1$ may also contain remediation logic (not shown) to initiate remediation of identified malware and recovery from the identified exploit.

In lieu of or in addition to static and dynamic scanning or operations being conducted by MCD systems $110_{1-N}$, it is contemplated that cloud or distributed computing services 140 may be implemented to perform one or more aspects of the MCD system, as described herein. In some embodiments, MCD system $110_1$ is used for static analysis and MCD system $110_1$ is used for dynamic analysis. MCD system $110_1$ and MCD system $110_N$ may be located in separate or remote physical locations. In one embodiment, static and/or dynamic analysis is performed in MCD system $110_1$, and the aggregating and scoring in MCD system $110_N$. In accordance with this embodiment, aspects of a MCD system (e.g., MCD systems $110_{1-N}$) may be adapted to establish secured communications with cloud computing services 140 for exchanging information. For example, storage device 185, database 185, or other aspects of the MCD system may be a remote or cloud based component accessed via secured communication.

Referring to FIG. 1, MCD systems $110_{1-N}$ may be communicatively coupled to management system 120 via network 125. In general, management system 120 is adapted to manage MCD systems $110_{1-N}$ and provide updates to their operation systems and software programs used in their virtual environments. In one embodiment, management system 120 may cause malware fingerprints generated by one MCD system (e.g., MCD system $110_1$) to be shared with one or more of the other MCD systems (e.g., MCD system $110_N$) for example, on a subscription basis.

Figure 2A:
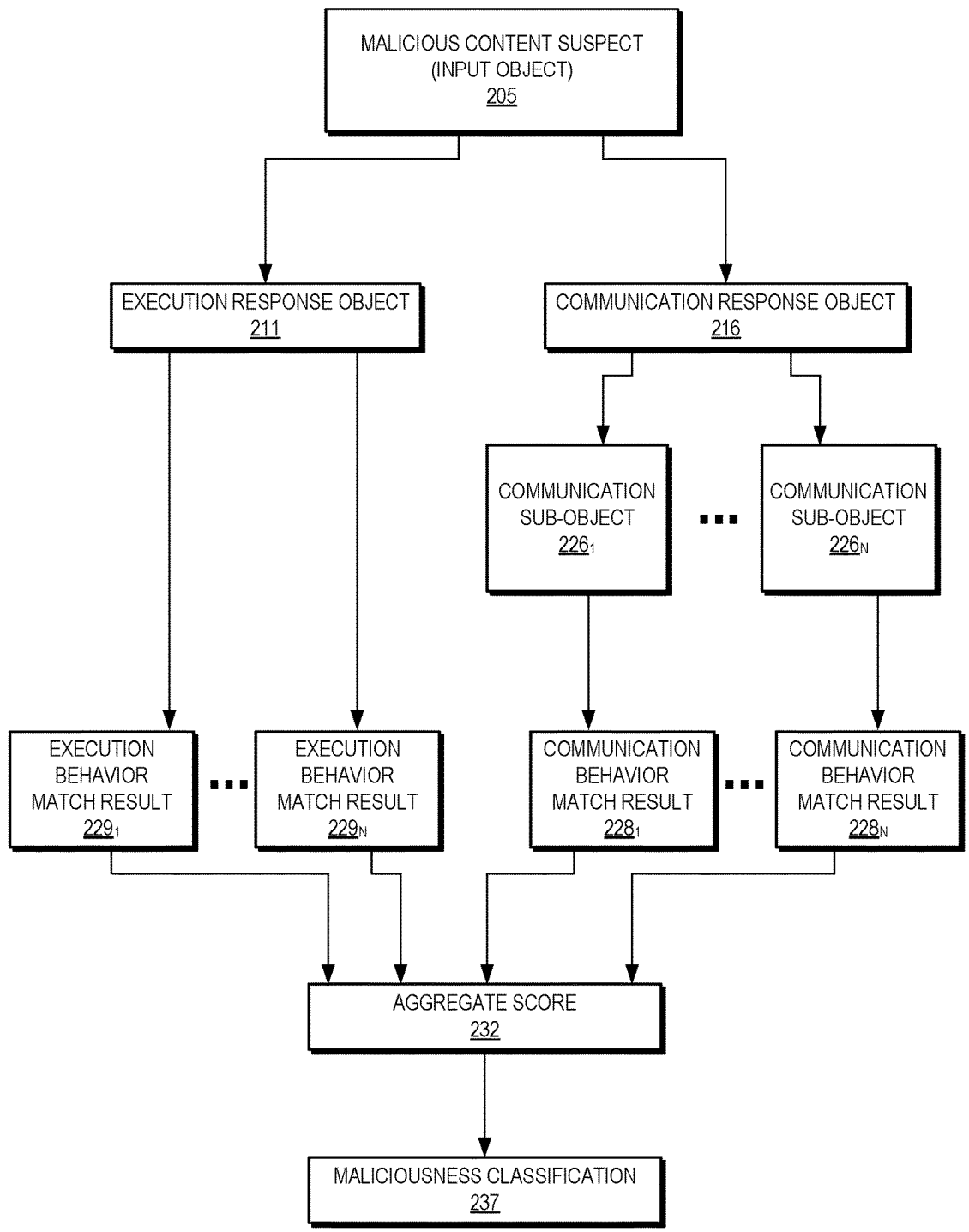
FIG. 2A is a flow diagram of data associated with malicious behavior detection, in one embodiment.

FIG. 2A illustrates data components accessed by or associated with a malicious behavior detector, in one embodiment. In one embodiment, in response to triggering or processing malicious content suspect 205, MBD 101 receives execution response object 211 and communication response object 216. Communication response object 216 may be parsed (e.g., by parser 225 described below with respect to FIG. 2B) into one or more communication sub-objects (e.g., $226_{1-N}$). One or more respective communication behavior detectors (e.g., communication behavior detectors $235_{1-N}$ described below with respect to FIG. 2B) can detect matches to one or more suspicious communication identifiers within parsed sub-objects $226_{1-N}$. In some embodiments, in addition to, or instead of the communication behavior detector(s), one or more execution behavior detectors (e.g., execution behavior detectors $236_{1-N}$ described below with respect to FIG. 2B) can analyze execution response object 211 to detect matches to one or more suspicious execution identifiers. An aggregator (e.g., aggregator 250 described below with respect to FIG. 2B) may aggregate the detection results from the behavior detectors into an aggregate score 232. A classifier (e.g., classifier 275 described below with respect to FIG. 2B) may read aggregate score 232 to produce maliciousness classification 237 of malicious content suspect 205.

Figure 2B:
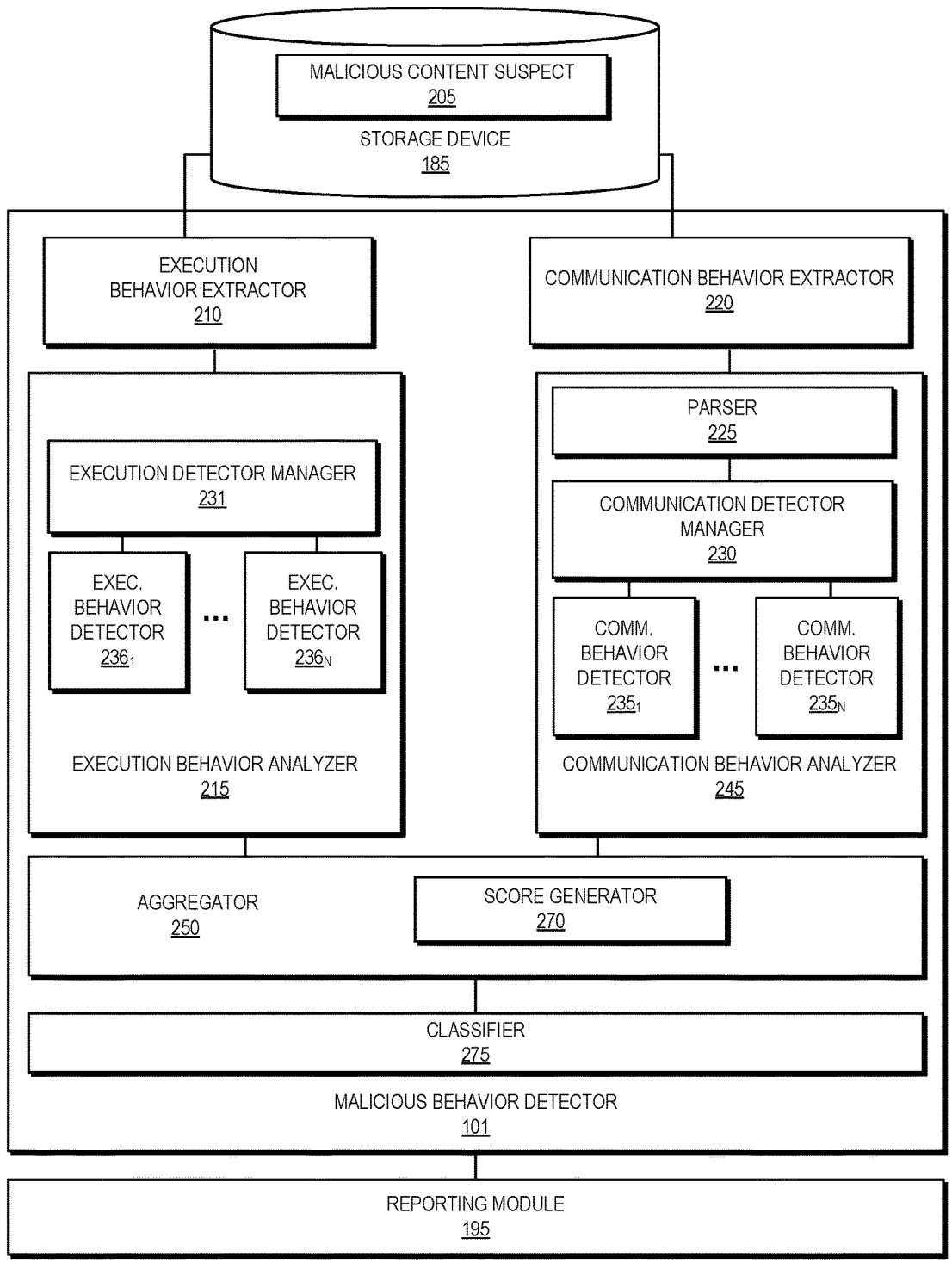
FIG. 2B is a detailed block diagram of logic associated with malicious behavior detection, in one embodiment.

FIG. 2B is a detailed block diagram of logic associated with MBD. In one embodiment MBD can retrieve or access (e.g., from storage device 185) malicious content suspect 205 (input object) to perform behavior monitoring or analysis. MBD can trigger, "detonate," or otherwise process the malicious content suspect 205 within a sandboxed or virtualized environment (e.g., VM $192_1$). For example, malicious content suspect 205 may be a file such as a document (e.g., word processing document, PDF, or other). Triggering the file may include opening the file in an associated program (e.g., Microsoft® Word, or Adobe® Reader). Malicious content suspect 205 may also be an executable file, and triggering may include loading and processing the executable within the VM. The malicious content suspect 205 may also be Internet content such as a web page, and triggering may include reading or accessing the Internet content with an associated program such as a web browser.

In one embodiment, MBD may detect one or more behavior responses resulting from the triggering or processing the malicious content suspect. For example, MBD may include a communication (i.e., network) behavior analyzer (CBA) for communication related behaviors and an execution (i.e., host) behavior analyzer (EBA) for execution related behaviors.

Communication behavior as used herein includes any communication attempted to be sent from, and in some embodiments intended to be received by, the MCD host virtual machine (e.g., VM $192_1$) during processing or triggering of malicious content suspect 205. Communication behavior may include attempted or realized communication (e.g., outbound traffic or transmission requests) across a network connection in response to processing or triggering an input object (e.g., traffic initiated by malicious content suspect 205). For example, malware may utilize a network connection in order to request instructions (e.g., from a malicious server), or to send out captured data. For example, the communication may be over a real or virtual network connection (e.g., via virtual network interfaces $198_{1-N}$) provided by the VM. As used herein, communication may include any data or content transmitted over a network. Communication behavior may include text, software, images, audio, or other digital data. An example of communication behavior includes web content, or any network data that may be transmitted using a Hypertext Transfer Protocol (HTTP), Hypertext Markup Language (HTML) protocol, File Transfer Protocol (FTP), transmitted in a manner suitable for display on a Web browser software application, or any network data that is transferred using other data transfer protocols). Another example of communication behavior includes email messages, which may be transmitted using an email protocol such as Simple Mail Transfer Protocol (SMTP), Post Office Protocol version 3 (POP3), or Internet Message Access Protocol (IMAP4). A further example of communication behavior includes Instant Messages, which may be transmitted using an Instant Messaging protocol such as Session Initiation Protocol (SIP) or Extensible Messaging and Presence Protocol (XMPP). In one embodiment, communication behaviors are stored or accessed within the MCD system as communication response objects as described in greater detail below.

Execution behavior, as used herein, includes initiating changes to the operating system, memory, or local file system. In some embodiments, changes include starting a separate process within the OS, creating a file, deleting a file, terminating processes, or changing a registry setting, just to name a few. Changes to the operating system, memory, or local file system may occur within a sandboxed virtual machine environment (e.g., MCD $110_1$). In one embodiment, execution behaviors are stored or accessed within the MCD system as execution response objects as described in greater detail below.

As introduced above, MBD 101 can receive communication and/or execution behaviors as a result of triggering or processing a malicious content suspect. MBD 101 may include communication behavior extractor 220 to capture detected network data for analysis by communication behavior analyzer 245 and/or execution behavior extractor 210 to capture host related response objects for analysis by the execution behavior analyzer 215.

Communication behavior extractor 220 may include processing logic to perform packet capture of outbound network traffic or content. Communication behavior extractor 220 may be implemented as part of a network stack (e.g., TCP/IP stack) and/or within a firewall of a guest operating system that hosts a VM in which malicious content suspect 205 is triggered or processed. Captured packets may be temporarily stored in a buffer (e.g., a MBD memory buffer) before being processed by a communication behavior analyzer (CBA). In one embodiment, communication behavior extractor 220 processes communication behavior into one or more communication response objects.

In one embodiment, in addition to or in place of communication behavior extractor 220, MBD 101 includes execution behavior extractor 210 to capture host related response objects for analysis by execution behavior analyzer 215 described in greater detail below. Execution behavior extractor 210 may include processing logic to capture requests received at VM $192_1$ to make changes to the operating system, memory, or local file system in which the malicious content suspect is triggered or processed. In some embodiments, execution behavior extractor 210 is part of dynamic analysis engine 190 and/or within a guest operating system that hosts a VM (e.g., VM $192_1$). In one embodiment, execution behavior extractor 210 processes execution behavior into one or more execution response objects.

In one embodiment, CBA 245 receives one or more communication response objects (e.g., communication response object 216) created as a result of processing or triggering the malicious content suspect within a VM. For example, communication response objects may be sent to CBA 245 from communication behavior extractor 220. In one embodiment, CBA 245 includes a parser (e.g., communication parser 225) to parse the communication response object into sub-objects. In one embodiment, CBA 245 further includes a communication detector manager (e.g., communication detector manager 230) to select particular sub-objects determined by the communication detector manager as compatible with one or more communication behavior detectors (e.g., communication behavior detector $235_{1-N}$). In some embodiments, the communication behavior analyzer 245 may operate independently from and in parallel (e.g., in an overlapping operating manner) to execution behavior extractor 210 and execution behavior analyzer 215 described in detail below.

In one embodiment, each communication behavior detector determines whether a respective sub-object (e.g., the compatible type sub-object assigned by a respective detector manager) matches a predetermined behavior or identifier. CBDs and EBDs may be directed towards matching predetermined sub-object characteristics to identifiers (e.g., suspicious behaviors). For example, identifiers may be email communication identifiers, content exfiltration identifiers, suspicious DDNS identifiers, or other identifiers. In some embodiments, identifiers may be stored on storage device 185, for example within a database, archive, or file and each CBD can access the identifiers when performing a match to sub-objects.

In one embodiment, a parser (e.g., parser 225) sub-divides communication response objects received from communication behavior extractor 220 (e.g., in response to MBD 101 triggering or processing of the malicious content suspect) into communication sub-objects. Parser 225 can receive, as input, the communication response object and perform a packet inspection on the network packets or content within the packets (e.g., network content within the communication response object). For example, triggering or processing the malicious content suspect may result in an attempt to send one or more communication traffic (e.g., network packets) from a VM to another machine (e.g., a remote machine). In some embodiments, the communication response object is a communication received from an external server. The communication response object may be stored in storage device 185 and sent to parser 225 by communication behavior extractor 220. In one embodiment, parser 225 identifies protocols so as to separate different types of communication within a particular data stream. For example, parser 225 can parse the network content for ports, content, and structures that indicate known protocols (e.g., HTTP, FTP, DNS, SMTP, etc.). The parser may apply parsing rules to extract chunks of data from the communication response object. For example, the rules may be related to headers in a packet and/or rules as to where to find header or destination address.

Parser 225 can output a sub-object (e.g., resulting object) for each different type of network content. In some embodiments, parser 225 provides high-level identification of each sub-object content type. For example, the parser may tag sub-content related to email communication with an email tag for easy association with communication behavior detectors compatible with email communication type sub-objects.

Although parser 225 is illustrated in FIG. 2B as integrated with the communication behavior analyzer 245, in some embodiments, parser 225 is separate and independent from the communication behavior analyzer 245. Parser 225 may be implemented as part of the network stack/firewall or integrated with a detector manager in some embodiments. In other embodiments, parser 225 and communication behavior extractor 220 may be integrated as a single unit. The communication behavior extractor 220 and parser 225 may be implemented in any one or more of the layers of a network stack, such as, an application layer, a transport control protocol (TCP) layer, an Internet protocol (IP) layer, and/or a media access control (MAC) layer, etc.

In one embodiment, communication detector manager 230 receives parsed content (e.g., sub-objects) from parser 225 and selects or invokes one or more specific compatible behavior detectors for each of the sub-objects. For example, communication detector manager 230 may select an email communication behavior detector to process a sub-object containing email communication. In some embodiments, communication detector manager 230 determines which communication behavior detectors to use as well as the order in which the behavior detectors will be applied. For example, communication detector manager 230 may determine processing an email CBD before a DDNS CBD may yield a more accurate malware determination. In other embodiments, CBDs may operate in parallel with other CBDs (e.g., in an overlapping operating manner).

In one embodiment, a DDNS CBD (e.g., one of communication behavior detectors $235_{1-N}$) determines whether a sub-object contains a match to known suspicious DDNS identifiers. For example, the DDNS CBD can detect network data referencing free DDNS servers. Although free (e.g., openly and publicly available, and accessible without monetary payment) DDNS services may be used for legitimate purposes, free DDNS is also often used by certain malware. Therefore, detection of these suspicious DDNS services within network content may contribute to the overall determination of whether the malicious content suspect is actually malicious. In some embodiments, a database of free DDNS services are stored in memory and each free DDNS is a separate suspicious DDNS identifier referenced by the DDNS CBD in determining whether there is a match or no match to the sub-object.

In one embodiment, a content exfiltration CBD (e.g., one of communication behavior detectors $235_{1-N}$) determines whether network data (e.g., predetermined a network traffic pattern) in a sub-object matches content exfiltration identifiers (e.g., of a host VM or physical host machine to the sub-object) directed towards general data theft. The content exfiltration identifiers may include the unique or almost unique environmental properties of the physical host machine, such as, for example, a computer name or Net-BIOS name, hardware identifying information (e.g., hardware identifiers such as serial numbers for processor, motherboard, basic input/output system (BIOS), network interface, and/or storage device), application identifying information (e.g., software product IDs), and/or user identifying information (e.g., username or user ID, security ID).

In one embodiment, an email CBD (e.g., one of communication behavior detectors $235_{1-N}$) can detect when the malicious content suspect response attempts to send email communication. For example, the email CBD can attempts to match an email communication identifier to the sub-object. The email communication identifier may include mail exchanger (MX) records and MXDNS requests specific to mail servers, data related to email, or other mail related network data/protocol.

In one embodiment, each CBD outputs notification of success or failure in matching particular suspicious identifiers to the sub-object. For example, the DDNS CBD may output notification that the sub-object contains a match to a known suspicious DDNS. Similarly, the email CBD may output notification that email communication is present (e.g., a email communication protocol match) in the sub-object.

In one embodiment, MBD includes an execution behavior analyzer (EBA) to receive execution response objects (e.g., execution response object 211) created as a result of processing or triggering the malicious content suspect within a VM. For example, execution response objects may be sent to EBA 215 from execution behavior extractor 210.

In one embodiment, execution detector manager 231 can select or invoke compatible execution behavior detectors (EBDs) based on the execution response object. For example, execution detector manager 231 may determine the execution response object contains a request for an operating system configuration change and can initiate processing of the execution response object by an EBD compatible with operating system configuration identifiers.

In one embodiment, each respective behavior detector (e.g., CBD and EBD) outputs match results to aggregator 250. Aggregator 250 can combine behavior match results and calculate an overall maliciousness score (e.g., determined by score generator 270). In one embodiment, aggregator 250 assigns a weight to each behavior match result according suspiciousness of the respective behavior match result compared to other behavior match results. For example, detecting email communication may be considered more likely benign than detecting a suspicious DDNS server. Behavior match results more likely to be benign may be adjusted to have lower relative weight when aggregated with other behavior match results. Alternatively, or additionally, behavior match results more likely to be malicious may have their weight increased relative to other less likely behavior match results.

In some embodiments, match results may be pre-weighted by each respective behavior detector. For example, the email CBD may output a match result and an associated weight to be used by aggregator 250 and score generator 270 when determining aggregate score. In some embodiments, a behavior detector may output multiple match results, each match result having an independent weight. For example, a behavior detector may have multiple possible identifiers to match and may output a match result for each separate identifier. For example, DDNS CBD may output a match to a DDNS server "X" identifier as well as a match to DDNS server "Y" identifier if both servers are referenced within a sub-object. In this prior example, the DDNS CBD may provide a separately calculated weight for each different match result according to suspiciousness of the matched identifier (e.g., respective free or suspicious DDNS servers "X" and "Y"). For example, certain free or suspicious DDNS servers may be more popular or more likely to be used by malware authors. Configuration settings associated with respective behavior detector may define how an identifier match is weighted relative to other identifiers for the same behavior detector.

In some embodiments, EBA 215 and CBA 245 behavior match results are aggregated separately (e.g., pre-aggregation) such that all EBA behavior match results produce an EBA aggregate score and CBA behavior match results produce a separate CBA aggregate score. The EBA aggregate score and CBA aggregate score may be adjusted or weighted as a set according to configuration preferences. For example, configuration preferences for MBD 101 may set the relative weight of the EBA aggregate score independently from the CBA aggregate score. Therefore, the EBA and CBA aggregate score weight adjustment can influence which behavior analysis carries a greater influence in determining the final or overall aggregate score.

In one embodiment, aggregator 250 includes a score generator 270 to output an aggregate score for the malicious content suspect. The aggregate score can relate to the probability that behavior match results indicate the malicious content subject should be classified as malware. In one embodiment, the score reflects an observed combination of behavior match results carries a higher probability for determining maliciousness of the malicious content suspect than the individual behavioral probabilities. For example, generic email communication in isolation may not be suspicious or anomalous behavior, however in combination with detecting suspicious DDNS servers, or other suspicious behaviors, the aggregated result can create a more accurate malware detection scheme.

In one embodiment, MBD includes a classifier (e.g., classifier 275) to interpret the output of MBD 101 (e.g., aggregate score 232) and provide an ultimate determination of whether the malicious content suspect should be classified as malicious. In some embodiments, the classifier determines whether the aggregate score 232 meets a predetermined score threshold for classifying the malicious content suspect as malware. The score threshold may be set by a user and saved to a configuration file accessibly by the classifier. In response to determining whether the score threshold is met, classifier 275 may flag malicious content by outputting a status or MBD result (e.g., maliciousness classification 237) to reporting module 195. In some embodiments, when the score threshold is not met, the classifier can output a benign classification for the malicious content suspect or request further analysis to be performed by the MCD or MBD.

In response to determining the malicious content suspect is malicious, MBD can trigger an alert or generate a fingerprint associated with one or more aspects of the malicious content suspect. A malware fingerprint or other unique identifier can enable detection of specific malicious behavior. For example, MBD 101 can determine specific malicious behaviors (e.g., fingerprints) related to suspicious generic behaviors and can apply the specific malicious behaviors in future malware detection. In contrast to generic behaviors, fingerprints as used herein are specific and unique identifiers to identify malware. Fingerprints can be used to identify malware without aggregating multiple behavior match results. For example, a behavior detector may find a match to an identifier that includes a general file transfer request to download an executable file and the specific requested URL (e.g., "http://example.com/bad.exe") associated with the generic behavior can be saved into memory (e.g., URL may be saved to storage device 185). In response to determining the malicious content suspect is classified as malware, one or more portions of the URL (e.g., "example-.com/bad.exe") accessed by the generic behavior (e.g., HTTP request) can be saved to storage device 185 as a fingerprint useful for detecting malware.

Figure 3:
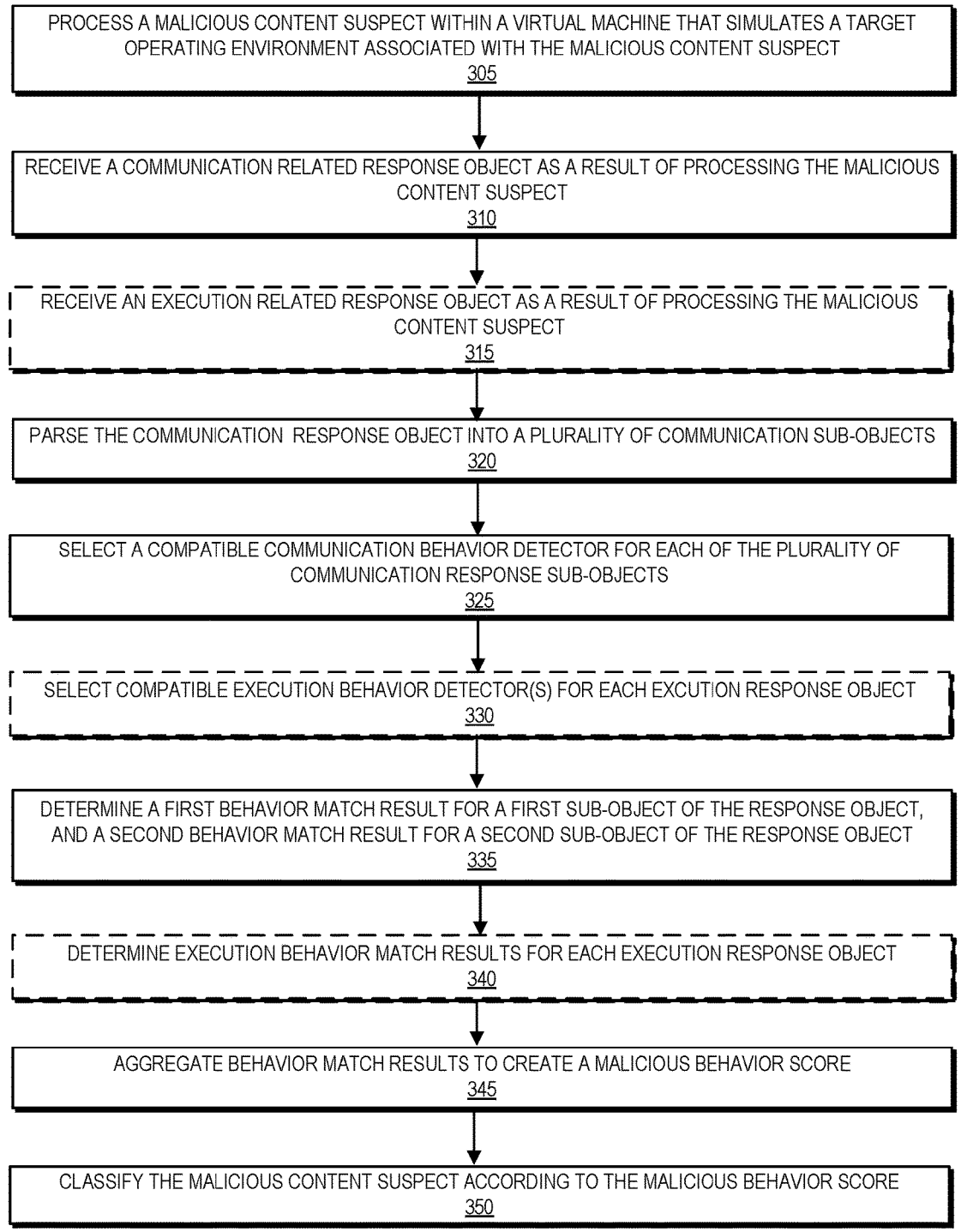
FIG. 3 is a flow diagram illustrating a method for malicious behavior detection, in one embodiment.

FIG. 3 is a flowchart illustrating malicious behavior detection, in one embodiment. At block 305, the embodiment (e.g., MBD 101) processes a malicious content suspect within a virtual machine that simulates a target operating environment associated with the malicious content suspect. For example, MBD can process an object within a sandboxed environment in order to perform dynamic behavior detector on the malicious content suspect.

At block 310, the embodiment receives a communication response object as a result of processing the malicious content suspect. The communication response object may be a communication behavior received by the communication behavior extractor and output to the CBA.

At block 315, the embodiment optionally receives an execution response object as a result of processing the malicious content suspect. The execution response object may be an execution behavior received by the execution behavior extractor and output to the EBA.

At block 320, the embodiment parses the communication response into a plurality of communication sub-objects. In one embodiment, parser 225 receives the communication response object and outputs a plurality of communication sub-objects, each sub-object compatible with one or more communication behavior detectors.

At block 325, the embodiment selects a compatible communication behavior detector for each of the plurality of communication response sub-objects. In one embodiment, communication detector manager 230 selects one or more compatible CBDs for each sub-object.

At block 330, the embodiment optionally selects a compatible execution behavior detector for each of the execution response objects. In one embodiment, execution detector manager 231 selects one or more compatible EBDs to process the execution response object.

At block 335, the embodiment determines a first behavior match result for a first sub-object of the response object, and a second behavior match result for a second sub-object of the response object. The first and second behavior match results may be respective communication behavior match result outputs from compatible CBAs.

At block 340, the embodiment optionally determines execution behavior match results for each execution response object.

At block 345, the embodiment aggregates behavior match results to create a malicious behavior score. For example, the embodiment may aggregate the first behavior match result with the second behavior match result, wherein a malicious behavior score is calculated according to an aggregated result from all matches. In some embodiments, each match result has an associated weight for determining the malicious behavior score. For example, the MBD can detect generic communication or execution behavior and assign a weight to detected behaviors. MBD can aggregate multiple behavior scores to provide an ultimate maliciousness determination.

At block 350, the embodiment classifies the malicious content suspect according to the malicious behavior score. MBD can determine if the aggregate score meets a maliciousness threshold. In response to determining maliciousness, an alert (e.g., a malware alert notification) may be sent to an administrator, and/or a fingerprint may be generated to aid in future malware detection.

Figure 4:
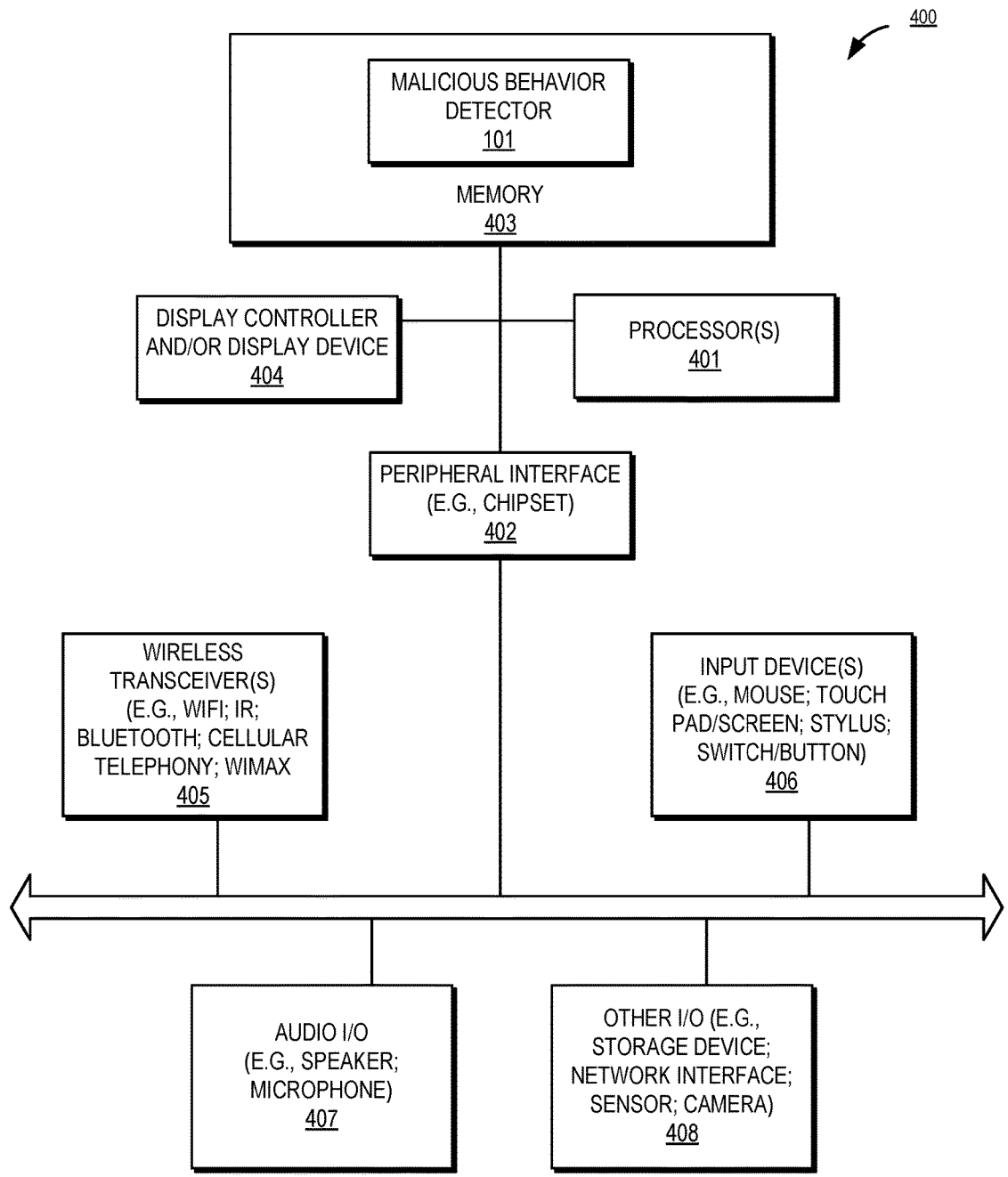
FIG. 4 is a block diagram illustrating an example of a data processing system which may be used with one embodiment of the invention.

FIG. 4 is a block diagram illustrating an example of a data processing system which may be used with one embodiment of the invention. In one embodiment, system 400 represents one or more MCD systems MC110$_{1-N}$. In some embodiments, system 400 represents one or more sub-components of the MCD system 110$_1$. For example, system 400 may perform any of the processes or methods described above, for example FIG. 3. System 400 may represent a firewall, network router, electronic device, network router, hub, wireless access point (AP), repeater, or any combination thereof.

Referring to FIG. 4, in one embodiment, system 400 includes processor 401 and peripheral interface 402, also referred to herein as a chipset, to couple various components to processor 401 including memory 403 and devices 405-408 via a bus or an interconnect. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 401 is configured to execute instructions for performing the operations and steps discussed herein.

Peripheral interface 402 may include memory control hub (MCH) and input output control hub (ICH). Peripheral interface 402 may include a memory controller (not shown) that communicates with a memory 403. Peripheral interface 402 may also include a graphics interface that communicates with graphics subsystem 404, which may include a display controller and/or a display device. Peripheral interface 402 may communicate with graphics device 404 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 401. In such a configuration, peripheral interface 402 operates as an interface chip performing some functions of the MCH and ICH. Furthermore, a graphics accelerator may be integrated within the MCH or processor 401.

Memory 403 may include one or more volatile storage (or memory) devices such as random access memory (RAM), dynamic RAM (DRAM), synchronous DRAM (SDRAM), static RAM (SRAM), or other types of storage devices functioning as non-transitory machine-readable storage mediums. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 402 may provide an interface to IO devices such as devices 405-408, including wireless transceiver(s) 405, input device(s) 406, audio IO device(s) 407, and other IO devices 408. Wireless transceiver 405 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 406 may include a mouse, a touch pad, a touch sensitive screen (which may be integrated with display device 404), a pointer device such as a stylus, and/or a keyboard (e.g., physical keyboard or a virtual keyboard displayed as part of a touch sensitive screen). For example, input device 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 407 may include a speaker and/or a microphone to facilitate voice-enabled functions, such as voice recognition, voice replication, digital recording, and/or telephony functions. Other optional devices 408 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 408 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 4 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of methods, logic, and symbolic representations of operations on data bits within a computer memory. These method descriptions and representations are the ways used by those skilled in the data processing arts to most effectively convey the substance of their work to others skilled in the art.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the FIGS. 2-3 can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting malicious behavior, comprising:
   processing an object within a virtual machine;
   receiving a response object resulting from or created in response to the processing of the object within the virtual machine;
   parsing the response object by at least subdividing the response object into a plurality of sub-objects, the plurality of sub-objects including a first sub-object and a second sub-object;
   determining a first behavior match result based, at least in part, on whether information associated with the first sub-object corresponds to at least one of a first plurality of identifiers associated with malicious activity;
   determining a second behavior match result based, at least in part, on whether information associated with the second sub-object corresponds to at least one of a second plurality of identifiers associated with malicious activity;
   aggregating at least the first behavior match result with the second behavior match result to produce an aggregated result, wherein a malicious behavior score is calculated based, at least in part, on the aggregated result; and
   classifying the object according to the malicious behavior score.

2. The method of claim 1, wherein the aggregated result includes aggregating behavior match results for each of the plurality of sub-objects, the behavior match results are determined based, at least in part, by determining whether information associated with the each of the plurality of sub-objects corresponds to one or more identifiers associated with malicious activity.

3. The method of claim 1, wherein the first behavior match result is determined by comparing a behavior characteristic of the first sub-object to an identifier.

4. The method of claim 3, wherein the identifier includes one or more of:
   a suspicious Dynamic Domain Name System (DDNS) identifier,
   an email communication identifier, or
   a network traffic pattern related to data theft.

5. The method of claim 1, wherein prior to determining the first behavior result and the second behavior result, the method further comprising:
   sending the first sub-object to a first communication behavior detector in response to determining the first sub-object is a compatible input for the first communication behavior detector; and
   sending the second sub-object to a second communication behavior detector in response to determining the second sub-object is a compatible input for the second communication behavior detector.

6. The method of claim 1, wherein the malicious behavior score is related to a probability that the object should be classified as malware.

7. The method of claim 1, wherein the first plurality of identifiers are different from the second plurality of identifiers.

8. A data processing system, comprising:
   a hardware processor; and
   a memory coupled to the processor for storing instructions that, when executed by the processor, causes the processor to:
   process an object within a virtual machine,
   parse a response object resulting from or created in response to the processing of the object within the virtual machine by at least subdividing the response object into a plurality of sub-objects, the plurality of sub-objects including a first sub-object and a second sub-object,
   determine a first behavior match result based, at least in part, on whether information associated with the first sub-object corresponds to at least one of a first plurality of identifiers associated with malicious activity,
   determine a second behavior match result based, at least in part, on whether information associated with the second sub-object corresponds to at least one of a second plurality of identifiers associated with malicious activity,
   aggregate at least the first behavior match result with the second behavior match result to produce an aggregated result, wherein a malicious behavior score is calculated based, at least in part, on the aggregated result, and
   classify the object according to the malicious behavior score.

9. The system of claim 8, wherein the aggregated result includes aggregating behavior match results for each of the plurality of sub-objects, the behavior match results are determined based, at least in part, by determining whether information associated with the each of the plurality of sub-objects corresponds to one or more identifiers associated with malicious activity.

10. The system of claim 8, wherein the first behavior match result is determined by comparing a behavior characteristic of the first sub-object to an identifier.

11. The system of claim 10, wherein the identifier includes one or more of:
   a suspicious Dynamic Domain Name System (DDNS) identifier,
   an email communication identifier, or
   a network traffic pattern related to data theft.

12. The system of claim 8, wherein prior to determining the first behavior result and the second behavior result, the processor is further configured during execution of the instructions, to perform operations comprising:
   sending the first sub-object to a first communication behavior detector in response to determining the first sub-object is a compatible input for the first communication behavior detector; and sending the second sub-object to a second communication behavior detector in response to determining the second sub-object is a compatible input for the second communication behavior detector.

13. The system of claim 8, wherein the malicious behavior score is related to a probability that the response object indicates the object should be classified as malware.

14. The system of claim 8, wherein the first plurality of identifiers are different from the second plurality of identifiers.

15. A system for detecting malicious behavior, comprising:
   a hardware processor; and
   a memory communicatively coupled to the hardware processor, the memory comprises a behavior analyzer that, when executed by the processor, receives a response object resulting from or created in response to processing of an object within a virtual machine, the behavior analyzer comprises:
      a parser, when executed by the processor, to parse the response object by at least subdividing the response object into a plurality of sub-objects including at least a first sub-object and a second sub-object,
      a first behavior detector, when executed by the processor, to determine a first behavior match result for the first sub-object of the received information,
      a second behavior detector, when executed by the processor, to determine a second behavior match result for the second sub-object of the received information,
      a detector manager communicatively coupled to the parser, the first behavior detector and the second behavior detector, the detector manager, when executed by the processor, to receive at least the first sub-object and the second sub-object from the parser, provide the first sub-object to the first behavior detector in response to determining that the first sub-object is compatible with the first behavior detector, and provide the second sub-object to the second behavior detector in response to determining the second sub-object is compatible with the second behavior detector,
      an aggregator, when executed by the processor, to aggregate the first behavior match result with the second behavior match result, wherein a malicious behavior score is calculated according to an aggregated result from at least the first behavior match result with the second behavior match result, and
      a classifier, when executed by the processor, to classify the object according to the malicious behavior score.

16. The system of claim 15, wherein the first behavior detector, when executed by the processor, determines whether information within the first sub-object matches one or more identifiers associated with malicious activity.

17. The system of claim 16, wherein the first behavior detector, when executed by the processor, determines the first behavior match result by comparing a behavior characteristic of the first sub-object to an identifier.

18. The system of claim 15, wherein the malicious behavior score is related to a probability that the response object indicates the object should be classified as malware.

19. The system of claim 15, wherein the memory further comprising:
   a reporting module, when executed by the processor, creates a malware alert notification or a malicious fingerprint in response to the classifier determining that the malicious behavior score exceeds a predetermined threshold.

20. The method of claim 1, wherein the information associated with the first sub-object is within the first sub-object.

21. The method of claim 1, wherein the information associated with the second sub-object is within the second sub-object.

22. The system of claim 8, wherein the information associated with the first sub-object is within the first sub-object.

23. The system of claim 8, wherein the information associated with the second sub-object is within the second sub-object.

24. A non-transitory, computer-readable storage medium having stored thereon instructions that, when executed by a processor, cause performance of operations comprising:
   processing an object within a virtual machine;
   receiving a response object resulting from or created in response to the processing of the object within the virtual machine;
   parsing the response object by at least subdividing the response object into a plurality of sub-objects, the plurality of sub-objects including a first sub-object and a second sub-object;
   determining a first behavior match result based, at least in part, on whether information associated with the first sub-object corresponds to at least one of a first plurality of identifiers associated with malicious activity;
   determining a second behavior match result based, at least in part, on whether information associated with the second sub-object corresponds to at least one of a second plurality of identifiers associated with malicious activity;
   aggregating at least the first behavior match result with the second behavior match result to produce an aggregated result, wherein a malicious behavior score is calculated based, at least in part, on the aggregated result; and
   classifying the object according to the malicious behavior score.

25. The storage medium of claim 24, wherein the aggregated result includes aggregating behavior match results for each of the plurality of sub-objects, the behavior match results are determined based, at least in part, by determining whether information within the each of the plurality of sub-objects corresponds to one or more identifiers associated with malicious activity.

26. The storage medium of claim 24, wherein the first behavior match result is determined by comparing a behavior characteristic of the first sub-object to an identifier.

27. The storage medium of claim 26, wherein the identifier includes one or more of:
   a suspicious Dynamic Domain Name System (DDNS) identifier,
   an email communication identifier, or
   a network traffic pattern related to data theft.

28. The storage medium of claim 24, wherein prior to determining the first behavior result and the second behavior result, the instructions that, when executed by the processor, cause performance of further operations comprising:
   sending the first sub-object to a first communication behavior detector in response to determining the first sub-object is a compatible input for the first communication behavior detector; and sending the second sub-object to a second communication behavior detector in response to determining the second sub-object is a compatible input for the second communication behavior detector.

29. The storage medium of claim 24, wherein the malicious behavior score is related to a probability that the response object indicates the object should be classified as malware.

30. The storage medium of claim 24, wherein the first plurality of identifiers are different from the second plurality of identifiers.

31. The storage medium of claim 24, wherein the information associated with the first sub-object is within the first sub-object.

32. The storage medium of claim 24, wherein the information associated with the second sub-object is within the second sub-object.

* * * * *